US008706308B2

(12) United States Patent
Reichmuth et al.

(10) Patent No.: US 8,706,308 B2
(45) Date of Patent: Apr. 22, 2014

(54) ENERGY-SAVING MEASUREMENT, ADJUSTMENT AND MONETIZATION SYSTEM AND METHOD

(71) Applicant: Energy Resource Management Corp., Portland, OR (US)

(72) Inventors: Howard Reichmuth, Hood River, OR (US); Terry Egnor, Portland, OR (US); William Campbell, Portland, OR (US)

(73) Assignee: Energy Resource Management Corp., Portland, OR (US)

( * ) Notice: Subject to any disclaimer, the term of this patent is extended or adjusted under 35 U.S.C. 154(b) by 0 days.

(21) Appl. No.: 13/718,752

(22) Filed: Dec. 18, 2012

(65) Prior Publication Data

US 2013/0110297 A1  May 2, 2013

Related U.S. Application Data

(63) Continuation of application No. 13/081,855, filed on Apr. 7, 2011, now Pat. No. 8,355,827.

(60) Provisional application No. 61/342,165, filed on Apr. 8, 2010.

(51) Int. Cl.
*G05B 19/02* (2006.01)

(52) U.S. Cl.
USPC ............................................ 700/286; 700/291

(58) Field of Classification Search
USPC ............ 700/286, 291, 295, 297, 287; 702/60, 702/61, 62, 179, 182; 705/412
See application file for complete search history.

(56) References Cited

U.S. PATENT DOCUMENTS

| | | | | |
|---|---|---|---|---|
| 5,181,026 A | * | 1/1993 | Granville | 340/870.28 |
| 5,337,955 A | * | 8/1994 | Burd | 236/91 F |
| 6,528,957 B1 | * | 3/2003 | Luchaco | 315/307 |
| 7,228,234 B2 | * | 6/2007 | McNally et al. | 702/3 |
| 7,379,997 B2 | * | 5/2008 | Ehlers et al. | 709/224 |
| 7,409,303 B2 | * | 8/2008 | Yeo et al. | 702/60 |
| 7,502,768 B2 | * | 3/2009 | Ahmed et al. | 706/21 |
| 7,552,033 B1 | | 6/2009 | Culp et al. | |
| 7,565,227 B2 | * | 7/2009 | Richard et al. | 700/291 |
| 7,620,517 B2 | * | 11/2009 | Scholtz et al. | 702/130 |

(Continued)

FOREIGN PATENT DOCUMENTS

GB     2448896     11/2008

OTHER PUBLICATIONS

European Search Report and Opinion dated Dec. 2, 2013 in re EPO Patent No. 11766753.5 (8 pgs).

*Primary Examiner* — Andrew Joseph Rudy
(74) *Attorney, Agent, or Firm* — AterWynne LLP

(57) ABSTRACT

System and method include precisely modeling of a facility's energy usage over time based on historic data, and precisely predicting or measuring its actual, reduced energy usage over time after a redesign, retrofit, or renovation, or other positive change to the facility. The energy cost savings, whether over a time point of view (POV) of predicted, real-time, or historic, are creditable to the intervening remediation or renovation of the facility's energy footprint. In accordance with one embodiment, multiple-variable inputs are modeled using arithmetic regression and steepest-descent convergence arithmetic solutions based in large part on building-science (construction) data versus outside average temperature (t) that simplifies the modeling and measurements. Additionality is thus addressed along with a system and method that is more accurate, more repeatable, more reliable, and thus more credible and more readily monetized.

22 Claims, 5 Drawing Sheets

(56) References Cited

U.S. PATENT DOCUMENTS

| | | | |
|---|---|---|---|
| 7,729,809 B2 * | 6/2010 | Noureldin | 700/291 |
| 7,983,795 B2 * | 7/2011 | Josephson et al. | 700/276 |
| 8,078,330 B2 * | 12/2011 | Brickfield et al. | 700/291 |
| 8,140,279 B2 * | 3/2012 | Subbloie | 702/61 |
| 8,145,361 B2 * | 3/2012 | Forbes et al. | 700/291 |
| 8,172,153 B1 * | 5/2012 | Kennedy et al. | 236/1 B |
| 8,174,268 B2 * | 5/2012 | Bose et al. | 324/418 |
| 8,200,370 B2 * | 6/2012 | Paik | 700/291 |
| 8,200,456 B2 * | 6/2012 | Marik et al. | 702/188 |
| 8,219,505 B2 * | 7/2012 | Richard et al. | 705/412 |
| 8,423,322 B2 * | 4/2013 | Steinberg et al. | 702/182 |
| 8,532,839 B2 * | 9/2013 | Drees et al. | 700/305 |
| 8,571,719 B2 * | 10/2013 | Altonen et al. | 700/287 |
| 2010/0114550 A1 | 5/2010 | Fujihara et al. | |

* cited by examiner

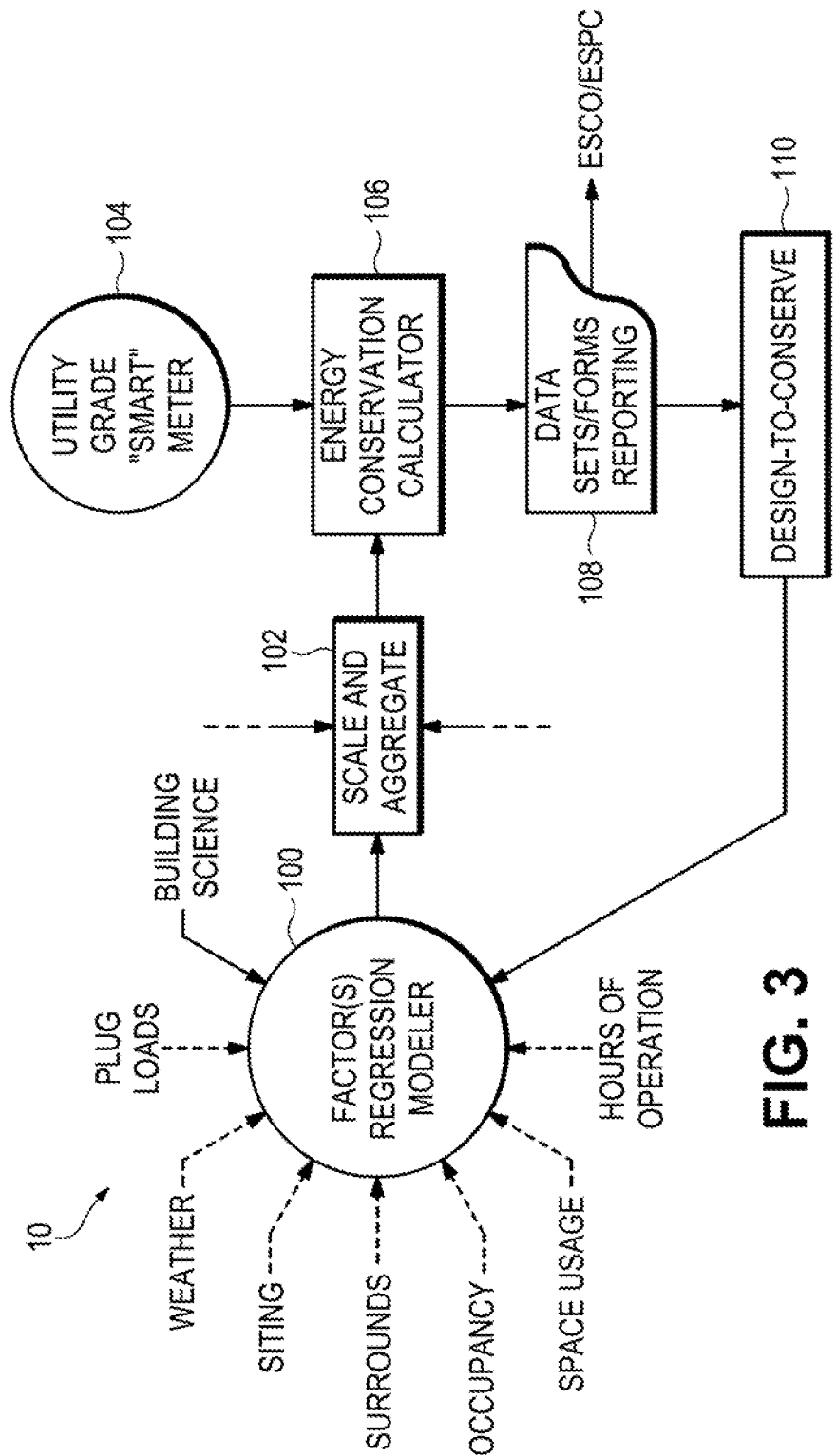

ENERGY-SAVING MEASUREMENT, ADJUSTMENT AND MONETIZATION SYSTEM AND METHOD

RELATED APPLICATIONS

This application is a continuation of and claims the benefit of priority to co-pending U.S. Non-Provisional application Ser. No. 13/081,855, filed on Apr. 7, 2011 and entitled ENERGY-SAVING MEASUREMENT, ADJUSTMENT AND MONETIZATION SYSTEM AND METHOD, which in turn claims the benefit of priority to U.S. Provisional application No. 61/342,165, filed on Apr. 8, 2010 and entitled ENERGY-SAVING MEASUREMENT, ADJUSTMENT AND MONETIZATION SYSTEM AND METHOD, the contents of each of which are hereby incorporated herein in their entirety by this reference.

FIELD OF THE INVENTION

The invention relates generally to the field of energy savings. More particularly, the invention relates to more accurately modeling past and future use, measuring current use and savings, diagnosing current problems and making adjustments where sensible, and monetizing energy savings.

BACKGROUND OF THE INVENTION

Conventional energy savings calculations typically rely on energy use baseline projections derived from built up engineering models or statistical regression models acting upon historic-use data. At the core is the ability to distinguish between energy reductions attributable to better energy systems design and modifications (savings) versus those attributable to business as usual. The former are thought to have additional value, including carbon emission credits or offsets, while the latter do not. The ability to accurately and confidently discriminate between the two and to quantify future energy use in a credible, transparent, and transactable manner has been problematic.

Conventional approaches include complex statistical regression models as well as engineering models that analyze multiple energy consumption subsystems and attempt to aggregate component data into a statistical future-use model system. Such aggregated data are compared to ongoing, metered use data for the modeled and aggregated subsystems to determine energy savings that might flow, for example, from converting the central heating plant component of an HVAC system to more energy-efficient, plural-distributed-space heating subsystems.

The prior art takes two basic approaches. The first involves using a regression fit to the data that can be made reasonably accurate if a full before-and-after data base exists. The weakness is that it employs statistical fit parameters that do not represent physical reality and therefore may not be able to represent any physical or operational changes in the performance of the site going forward. The second approach is an engineering modeling approach that, according to the literature, models actual energy usage to an accuracy that is typically only approximately plus or minus thirty percent (±30%) unless done in a research context where the cost and time involved is out of proportion to the value of the savings.

FIG. 1 is a graph that illustrates a prior art approach to regression modeling of a single fuel based upon historic data to predict future energy use (upper trace "before" case), as well as predicted or actual energy consumption (lower trace "after" case), over time before and after a potentially creditable redesign or renovation of an existing facility. The horizontal axis represents the passage of time, whether measured in hours, days, months, or years. The upper smooth trace illustrates the historic baseline energy consumption typically derived by statistical modeling from utility bill or model data. The continued dashed line extends that historic baseline as adjusted for routine variables such as temperature. This represents what energy the building would have consumed absent the efficiency improvements. The diagonal descending line illustrates the change in use during the installation of the efficiency measures. The lower smooth trace illustrates the predicted value of the adjusted as-improved energy consumption (which of course is lower if the improvement is truly so) based upon a second regression or engineering analysis that attempts to capture the projected impact of the improvements. This is used by the building operator to identify anomalous behavior for fault detection and diagnostics. The rectangular points superimposed on the lower trace illustrate the measured, actual consumption of the as-improved building as measured by a utility-grade meter(s).

The difference at any point in time between the upper adjusted historical trace and the lower meter points of FIG. 1 represents the improvement-based energy savings or cost avoidance, whether measured in power, energy, carbon, or cash value. Thus, if the upper trace was accurate and, more importantly, credible, then the energy savings based upon the improvement would be clear. Unfortunately, as will be discussed further below, typically the trace is neither accurate nor credible. Thus, there remains no cost effective credible basis for energy credits or carbon offsets based on conventional modeling and metering technologies or methods.

Conventional approaches also make simplifying assumptions and use simplistic approaches to both regression modeling to predict future baseline energy use and to accurate measuring of current energy use. The net effect of these simplifications is inaccuracy and uncertainty, e.g. lack of credibility, in modeling and measurement. Creditable energy savings, e.g. carbon offsets or hard cash, often end up in the wrong pocket. This is because presumably loose energy savings performance and/or measurement standards (e.g. energy savings must be 10% or more on the energy bill) are typically built into contractual agreements that favor one part-y to an energy credit or monetization transaction over another (e.g. a utility over a customer). For example, an energy provider or distributor might presume that difficult to measure energy cost savings are only 10% and will be willing to pay only for such a conservative savings presumption, while the actual savings over time are significantly greater. Often the presumption is expressed: if a customer installs a particular energy-savings package, then the customer will be "deemed" to have saved a quantity of energy, and there is no "need" for precision in measurement of energy savings or indeed any measurement at all. Thus, precision measurement is obviated and energy generation is relegated to a utility's administrative or customer service line item instead of being properly ascribed as a saleable (or otherwise monetizable) product of energy conservation.

In 2007, the Efficiency Valuation Organization (EVO) published the International Performance Measurement and Verification Protocol (IPMVP). The IPMVP purports to establish criteria for measuring and accounting for energy savings based upon a variety of assumptions, metrics, and guidelines. It further suggests the importance of modeling only relevant independent variables and not modeling irrelevant variables, it identifies many such supposedly relevant independent variables. The IPMVP fails to identify any reality-based, i.e. building science-based, variables as part of its guidelines or proposals.

IPMVP notwithstanding, there is no widely accepted cost effective "meter" for measuring energy use reductions attributable to energy efficiency improvements that can be routinely deployed in a business context. Part of the reason may be that utility companies have their own cultural focus, even the most progressive and decoupled of them. That focus is energy sales rather than energy efficiency with its virtues including coincident factor, no transmission cost, local economy improvement and competitiveness, lower first cost, stable long-term costs, etc. Thus, the widespread use of Option C metering as described by IPMVP has been largely ignored in favor of central power station project developments by utilities.

Building science has taught us that each building has a "signature" that describes the building's reaction to variable temperature throughout the year whether measured in seasons, months, 24-hour periods, hours or some other time base. A typical building signature graph is shown in FIG. 2. Those of skill in the art will understand that the ELECTRICITY curve goes up with increasing temperature, in large part due to air conditioning/ventilation demand, while the GAS curve goes up with decreasing temperature, in large part due to heating demand. These are somewhat idealized curves, but they are an accurate signature of a building's power consumption reaction to changes in average outside temperature. See also FIG. 2A, which illustrates the area-normalized energy components of an end-use energy model versus average-month temperature, and which identifies the major contributors to energy consumption in a typical facility, e.g. a building.

H. Reichmuth, PE, *A Method for Deriving an Empirical Hourly Base Load Shape from Utility Hourly Total Load Records*, published by the American Council for an Energy-Efficient Economy (ACEEE or ACE$^3$), (August, 2008), is also background to the present invention. That article describes the use of non-heating/cooling base load shapes to derive heating and cooling end-use load shapes, the use of locus minimum load shapes to tame the data, and a way of truing the demand to arrive at an empirical hourly base load shape. The article addresses only the aggregate whole utility (utility-wide) planning from the utility's point of view (POV). It does not address specific site or facility energy tracking from the POV of the facility's carbon footprint, improvement, and metering of energy cost-avoidance.

A conventional way of viewing energy cost savings or credits is expressed in the following familiar formula:

$$S = C_H - C_C \pm Adj,$$

wherein S is the energy cost Savings in dollars, $C_H$ is the Historic energy Cost (at current rates). $C_C$ is the Current energy Cost, and Adj are adjustments, all units being currency units such as US dollars. The problem with this formulation is that most parties to an energy credit agreement agree in large part with the formula and the cost factors but disagree strongly about the adjustments that might be made under the contract. This is because under the conventional approach, the adjustments are an arbitrary attempt to link a purely statistical variation to one or more real world changes. For example, did an increase in use come from inefficiencies in the improvements or from additional use of office equipment? Conventional statistical modeling introduces certain error into such a seemingly simple calculation. These and other uncertainties about the calculation of energy credits remain unaddressed and unresolved thereby undermining the value of the energy efficiency.

In brief summary, the prior art fails to teach either appropriate metrics (techniques) or meters ('metering instruments') for reliably, accurately, repeatably, and thus credibly predicting and/or measuring energy savings in a way that can be applied cost effectively in a routine business context. Moreover, the prior art fails to teach integrated systems and methods that reliably, accurately, repeatably, and thus credibly, account for energy cost avoidance as a systemic solution in a way that can be applied cost effectively in a routine business context.

BRIEF DESCRIPTION OF THE DRAWINGS

FIG. 3 is a system block diagram illustrating one embodiment of the invented efficiency-generator system.

DETAILED DESCRIPTION OF THE PREFERRED EMBODIMENTS

Figure 1:
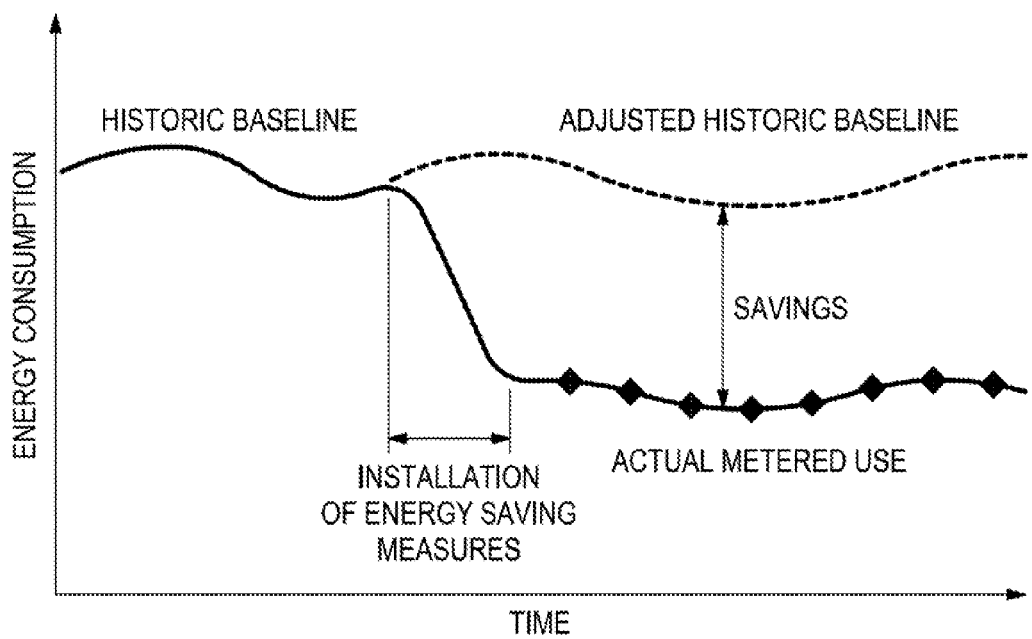
FIG. 1 is a graph illustrating the tracking of a facility's historical energy consumption predicted for the current conditions versus its actual metered energy consumption over the same time interval.

Embodiments of the invention adhere to the principles of the International Performance Measurement and Verification Protocol (IPMVP) while incorporating three significant enhancements to the IPMVP-adherent process, which makes it much more robust. Two such enhancements are the result of the use of the analog building model (also referred to herein as an 'analog facility model', or ABM), which is a combined physical/statistical model based on measured energy use and coincident temperature data: (1) the ABM provides a singular fit to the data that is constrained by physical laws as well as mathematics and is therefore uniquely representative of the actual building, and (2) the process allows the disaggregation of the energy use into component end-uses (heating, cooling, etc.) that aids in both initial diagnoses and in adjusting for non-routine changes in the building over time. A third enhancement is the incorporation of statistical uncertainty in the estimation of savings which provides quality control of the required data.

The term 'non-routine changes' herein refers to changes to the design, materials, configuration, structure, energy-consuming appliances, etc, within a facility that have the potential to lead to a lasting shift in energy load patterns. These can include installing more energy efficient appliances, insulating walls, installing solar panels to produce power, and other lasting, energy load-altering changes. Ordinary and expected changes such as building occupancy, seasonal changes in energy use or the types of energy used, ordinary variations in energy consumption due to daily human activities, etc. are generally considered 'routine changes.'

These enhancements provide two important benefits: (1) a clear process for handling common changes that occur in buildings and which often create challenges for more typical measurement and verification (M&V) approaches, and (2) greater accuracy and certainty in contracted savings estimates. With these enhancements, the invention not only meets the requirements for adherence to IPMVP, but it is even more rigorous, includes more features, and is a clearer, more prescriptive process than has been implemented previously.

The enhanced process embodiments are sufficiently robust to meet the requirements to be part of a utility provider's energy supply portfolio, and to provide building operators an improved basis for performance. Indeed, we refer to the output from this enhanced M&V process as a virtual meter, and refer to the savings calculated by the virtual meter as efficiency generation (EG).

Key features of the invented embodiments include but are not limited to: (1) providing more rigorous M&V than required, or conventionally applied, for adherence to IPMVP; (2) including a combined physical/mathematical model (the ABM), calibrated to actual utility bills, to ground the results from the regression model in reality, and to prepare for analysis of any future non-routine adjustments; (3) accounting for routine adjustments, following best practice modeling procedures, including provision of the statistical properties of the regression models, such as uncertainty, and (4) quantifying the required amount of data necessary to obtain a robust baseline model of the historical (pre-project) conditions, based on desired confidence level and anticipated savings.

From a programmatic standpoint, one or more embodiments provide several additional benefits. Because the resulting model is tied to a real building, the results are less subjective and highly replicable. Also, the process is automated, reducing analysis time and costs substantially.

The present invention is useful in energy savings measurement, diagnosis, adjustment, audit-trail, and credit or monetization by virtue of an increase of accuracy and ease of use in modeling future baseline use based upon historic use data and measuring, recording, reporting actual energy-use savings and linking both to actual building characteristics. While the invented embodiments are IPMVP Option C adherent they also include several enhancements, as will be recognized by an ordinarily skilled artisan based on the description provided herein. Unlike prior art methods, one or more of the invented embodiments comprehend the energy use impact of non-routine changes to a facility, including energy-conserving improvements. The invention thus "levels the playing field" among various developers, contractors, project designers, suppliers, engineers, lenders, fossil-based (carbon) suppliers and distributors, and credit-worthy brokers, e.g. energy service companies (ESCOs), thereamong.

The energy streams into a building, for example, are understood to be characterized by a carbon footprint that is increasingly well understood and measurable because they directly or indirectly are tied to dwindling fossil fuel sources. The carbon emissions from one or more buildings, plants (e.g., factory), or campuses, or any combination thereof (referred to herein generally and intentionally broadly as a "facility" whether individually or collectively) can be derived therefrom. Therefore, embodiments of the invention comprehend application to buildings whether individually, or plurally but aggregated as an actual or conceptual facility. Thus, efficiency gains from designing-to-conserve or from renovation of existing facilities now can be better quantified and can better answer the important question of additionality.

Energy streams into a building include direct fuel types (natural gas) and indirect fuel types (coal, gas, oil mix in the electricity generation, chilled water, hot water or steam flow), so when one is more accurately measuring such inflows, one is more accurately measuring carbon footprint. The savings to the more accurately measured carbon footprint flow from more accurately reduced carbon emissions, and assist the historically problematic additionality determination. These savings also produce worthy credits or other monetized rewards like earned income or even well-deserved profits to those involved in creating the energy cost avoidance.

The ability to accurately predict future or present energy savings or cost avoidance is a result of the invented system's greater ability to distinguish between changes in consumption caused by use increases or reductions associated with a building's primary purpose (which generally do not represent additionality) and changes in consumption caused by better building and energy systems design (which generally do represent additionality). So, a building that is subject to such modeling and measurement as provided by the present invention can potentially qualify for building carbon credits or offsets that would be heretofore unrealizable. Further, the invented system provides sufficient audit and records transparency that a new standard will emerge that can meet domestic and international norms for additionality and market transactability of energy conservation and monetizable cost avoidance.

Referring now to FIG. 3, invented energy efficiency generator system 10 in one embodiment will be described. "Energy efficiency generator" refers to the invented mechanism for realizing energy cost avoidance (a new energy form, or at least a new way of defining energy) "supplied" by the system to the earth's energy grid. It may be thought of as a precision instrument providing quantification of such energy cost avoidance. Some in this field refer to the unit power and energy savings as "Negawatts" or "Negawatt-hours," respectively. A typical embodiment of the invented system 10 includes one or more variables or factors regression modelers 100, a scale and aggregate mechanism 102, a utility grade "smart" meter 104, an energy conservation calculator 106, and a data sets/forms/reports (reporting) mechanism 108. Modeler 100 will be understood to comprehend one or more relevant variables including plug loads, weather, site, surrounds, occupancy, space usage, hours of operation, and building science.

It is noted that in FIG. 3, building science is indicated by a solid line, while the remaining factors are indicated by dashed lines. This is to highlight the important contribution of building science to the invented system.

Scale and aggregate mechanism 102 can take the form of a simple effect-multiplier that takes into account multiple modeling inputs from one or more subsystems or buildings. The scale and aggregate mechanism 102, or 'data aggregator,' is generally coupled with the calculator 106, and additionally with either or both of the modeler 100 and the "smart" meter 104. In a typical embodiment, the data aggregator includes device-readable instructions configured when executed by data processing circuitry, to cause the data aggregator to aggregate a time-based facility energy load data from two or more buildings. The aggregated data are then considered to represent a single facility that encompasses the two or more buildings.

Meter 104 is preferably a smart meter that precisely measures facility energy loads in real time and supplies precise load data to calculator 106. More broadly, however, a 'suitable' meter 104 can be nearly any known energy meter apparatus configured to measure a load (e.g., usage, flow, consumption, demand) on an energy source (e.g., electricity, gas, etc.) utilized by one or more sub-systems and/or end uses of a facility (e.g., building, grouping of buildings, etc.).

Calculator (or comparator, or differencer) 106 effectively determines the real-time or run-time difference or delta (Δ) between two time-based inputs.

Data sets reporting mechanism 108 can output data received from calculator 106, whether the data are raw, processed, tabulated, graphed, or in other forms useful to a user. Users might include, for example, an energy service company (ESCO) that is attempting to monetize energy conservation measures (ECMs) perhaps under an energy savings performance contract (ESPC). Those of skill in the art will appreciate that an embodiment of a data sets reporting mechanism 108 can produce semi- or fully-automated billings, e.g. mechanism 108 can directly generate an invoice representing an earned energy credit or offset. Such report in accordance with the invention can take any suitable form, e.g. hardcopy or electronic.

Figure 4:
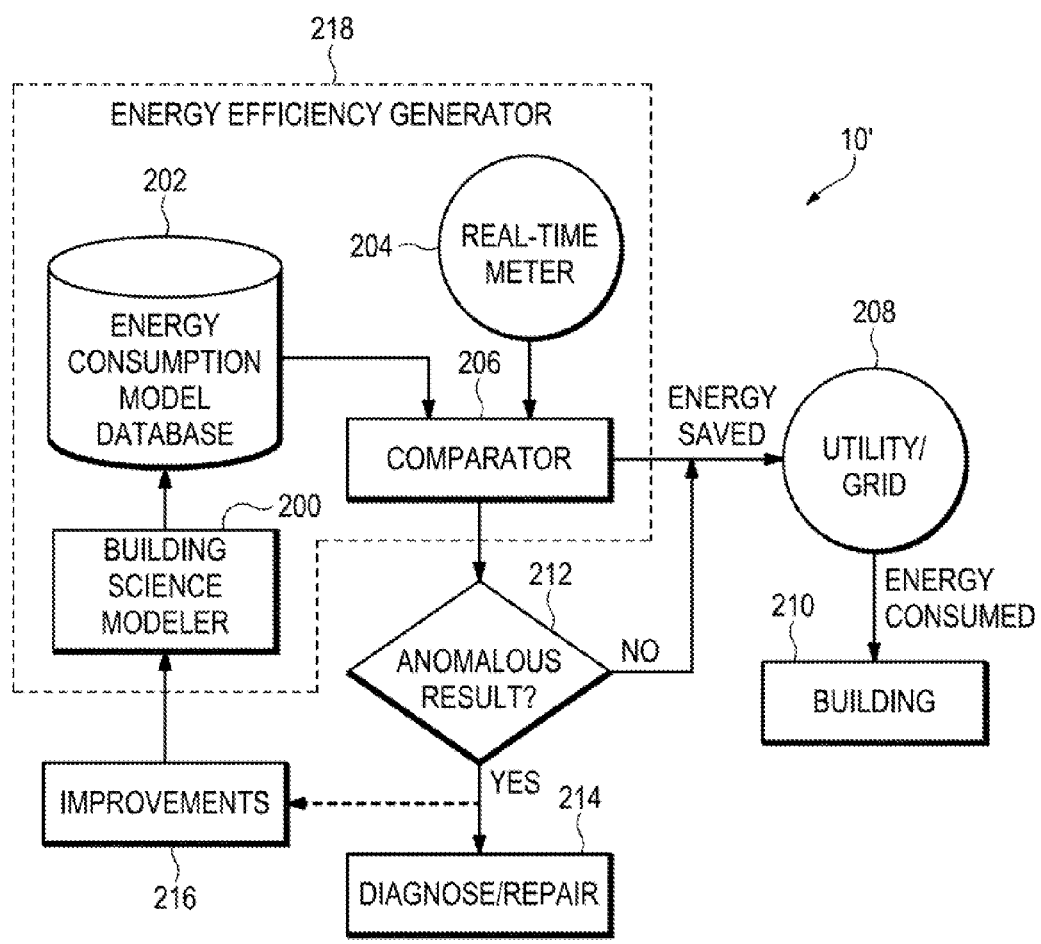
FIG. 4 is a system block and process flow diagram illustrating another aspect of the invention in terms of building science-based energy-efficiency generation systems and monetization thereof.

Additional embodiments of the above described modeler 100, scale and aggregate mechanism 102, meter 104, calculator 106, and data sets reporting mechanism 108 are discussed further with respect to FIG. 4, and are likewise contemplated as being within the scope of those features according to the embodiment depicted in FIG. 3.

Data sets 108 can also be manually or automatically reviewed by design personnel at design-to-conserve functional block 110, the output of which can be re-modeled or originally modeled by regression modeler 100 in what will be referred to herein as a closed-loop design and meter system 100. Thus, original facility design can be performed at block 110 with conservation in mind, and the result of such best design practices can be monitored for its effectiveness in accordance with the invention. Alternatively, modified facility design (design modifications) can be performed at block 110 to realize greater energy cost avoidance.

Smart meter 104 can also include a controller portion that effectively controls a building's heating and cooling sub-systems, for example, in real-time response to performance measurements. For example, it can use a proportional-integral-derivative (PID) approach to data analysis, thus to account not only for first-order power demand but also for second- and third-order demand. Thus, power usage, rate of power usage (first derivative), and even rate of change of power usage (second derivative) can be monitored for more effective and responsive control of a facility's heating, cooling, and other energy-consuming subsystems.

Conventional statistical regression cannot be easily applied to models expressed in physical building parameters rather than statistical coefficients. Therefore, those of skill in the art will appreciate the important inclusion (at the possible exclusion of other variables) of temperature plus building (design, engineering, construction, building materials, etc.) science-based mathematical reaction approach that avoids conventional statistical regression and that uses software-implemented mathematical algorithms including a novel steepest-descent solution-convergence technique that improves modeling by allowing the ascribing of physical attributes to the data.

For any given set of time-based (e.g., periodic) usage data, the resulting whole building model is termed here an equivalent "Analog Building Model" (ABM). In a real sense the ABM is an inverse model: it is a model of a hypothetical very simple building that produces the same pattern of periodic (e.g., monthly) energy bills as the real building. The approach to building science-based modeling is described at some length below.

In general, the larger the building or group of buildings, the more accurate the signature. The functional relationships shown in FIG. 1 are based on average monthly temperatures and are sufficient to quantify the monthly performance of the building or group of buildings on an average monthly basis. This level of quantification has been determined in accordance with the invention to be sufficient to support contractual relationships that deal in monthly energy savings without regard for the precise timing of the savings.

In practice, the value of the savings is often very time dependent, such as savings on a hot summer afternoon are more valuable to the utility that must purchase costly extra power at this time. Therefore, most energy contracts are structured on a time of day basis with energy valuation differentiated into hourly categories (on-peak, off-peak, monthly maximum peak, etc). In order to align with the common contractual basis for valuing energy and savings, the estimates of average daily energy use or savings found in FIG. 2 must be developed further by extending the estimates of average daily energy use to estimates of the associated average hourly energy use. This is accomplished by using the same hourly load measurements as were aggregated to produce the average daily or monthly energy usage functions as are portrayed in FIG. 2.

Figure 2:
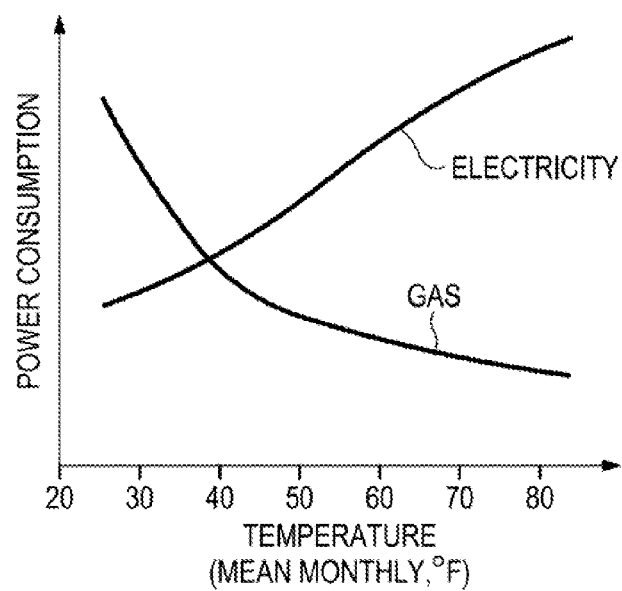
FIG. 2 is a graph illustrating a building's 'signature' reaction to temperature as being characterized by two distinct electricity and gas consumption curves versus average outdoor temperature (T).
Figure 2A:
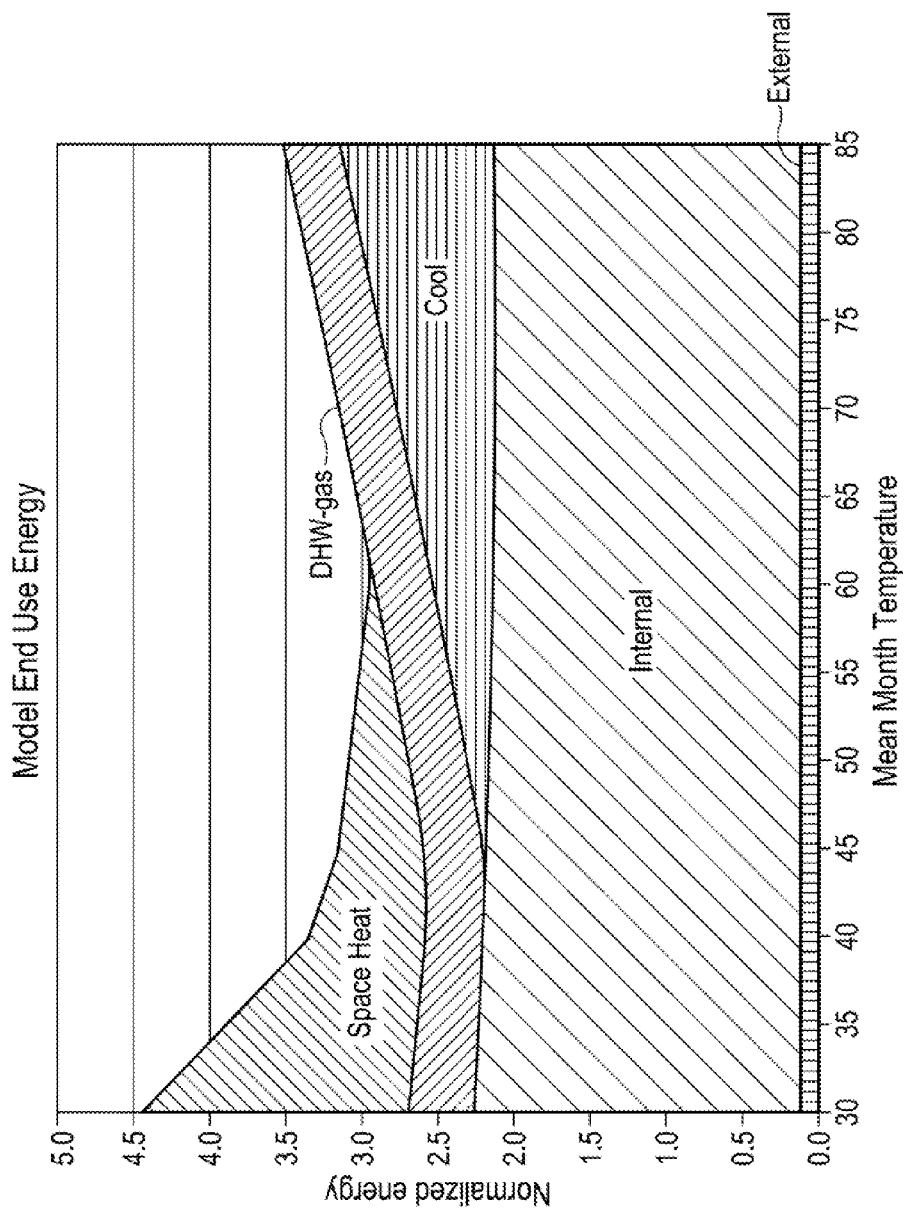
FIG. 2A is a patterned graph illustrating the normalized, model end-use energy components versus mean- or average-month temperature, wherein each color represents a different component within and around a facility such as a building.

The first step is to disaggregate the energy signature shown in FIG. 2 into its constituent end-uses. The energy signature should be seen as the sum of several fundamental end-uses as illustrated in FIG. 2A.

The fundamental end-uses are an inherent result of the physical parameters that have been fitted to and derived from the monthly utility billing data (representing the whole building energy usage data including all fuels) and the associated average monthly temperatures. The need to develop models of the constituent energy end-uses is one of the most significant reasons to fit a physical model to the monthly utility data instead of a simple statistical model. The prior art typically fits simple statistical models separately to the electric energy and the fuel (gas) energy. In the prior art, these separately derived models make no use of the energy balance of the building or facility, which is the essential information that enables the accurate determination of the constituent end-uses. Good engineering practice requires that building models refer to the energy balance of a building in order to estimate accurately the interactions between energy uses. For example, the heat generated by electric lighting can reduce the amount of gas heat necessary to heat a space, or electric lighting and computer loads become also a cooling load.

By contrast, this invention fits a simple physical model of the building or group of buildings to both the electric and gas billing data simultaneously, thereby using the analytical advantage provided by reference to the building energy balance. In this invention, the physical model of the building is the sum of the several constituent energy end-use models so that a function of each constituent energy end-use versus average monthly temperature is an inherent outcome of the model.

For each of the constituent energy end-uses, the hourly load measurements are used to develop "hourly load factors," where an hourly load factor for a particular hour is a fraction less than 1 that describes the portion of the average daily energy for that constituent end-use that is used in that particular hour. Naturally, the load factors for all 24 hours of the day will sum to 1. There will be a set of 24 hourly load factors for each constituent end-use. For some constituent end-uses it may be necessary to develop a different set of hourly load factors for each month. The constituent end-uses align broadly to the energy use categories of heating, cooling, base-load, domestic hot water (DHW), and any known or metered end-use.

The use of such broad categories in this invention is a major savings in time and overhead cost that would otherwise be employed in compiling details that ultimately have little bearing on the final result. These very broad categories in fact aggregate many more detailed and significant end-use distinctions such as lighting, plugs, fans etc. Often the use of such broad categories, without more detailed distinctions, is a source of error. Errors due to this broad characterization are minimized in accordance with the present invention by using the same hourly load data to derive both the aggregate physical models as illustrated in FIG. 2 and the hourly load factors for the constituent end-uses. The errors due to broad characterization are also minimized in this invention by using exactly the same constituent end-use categories in the hourly load factor derivation as were used in the physical model fitted to the data.

The buildings and groups of buildings most suited to this invention will have an orderly temperature dependency as shown in FIG. 2. This is essentially a seasonal dependency with maximum energy use in the summer for cooling and in the winter for heating. The mid seasons approximately April and September will have the least heating and cooling and some days may have essentially no heating or cooling other than the minimal auxiliary energy use necessary to maintain the heating and cooling systems in a standby state, which is considered here to be a portion of the constituent end-use energy designated as base-load energy. The hourly load factors for the base-load are developed with reference to the hourly load measurements for the months of March-April and September-October.

A separate set of hourly load factors may need be developed for different day types (occupied, unoccupied, etc.), but in most cases that is unnecessary. The hourly load measurements for the particular day type are sorted by hour of day and the minimum load for each of the 24 hours is established. These 24 hours of monthly minimum load constitute a 24 hour load shape that is the locus of minimum load, and this is taken as the load shape of the base-load. This minimum load shape may contain sub-portions with a well known or measured load shape, such as for exterior lighting, which can be a separately designated constituent end-use. In this manner, the present invention uses well-known information when it is available. The hourly load factors for the well-known load are not developed, because these are already known. The load factors are then developed from the difference between the locus of minimum load and the well known loads that are part of it. The hourly load factors per the definition are that fraction of the daily load that occurs in each separate hour.

The hourly load factors for the heating and cooling constituent end-uses are then developed with reference to the hourly load measurements for the heating and cooling seasons. For both heating and cooling, the peak load day for each heating or cooling month is identified, and the load shape from this peak day becomes the load shape from which the heating and cooling hourly load factors for each heating or cooling month are derived. The peak day load shape, rather than an average day load shape, is used as a reference because it has been found to be the clearest expression of the human and control behavior that drives that load. The hourly load factors for the constituent heating and cooling energy end-uses are then derived from the shape of the hourly load defined by the difference between the total peak day load for heating or cooling days and the base-load, which has been previously calculated, and any other known loads.

The above discussion of the importance of building science-based modeling does not undermine the importance of FIG. 3's inclusion of multiple factors into modeler 100. The other factors that are described and illustrated herein will be appreciated by those of skill in the art to represent second-tier factors of secondary importance that can be used to overlay the building-science data. In other words, base-lining should first be building science-based and can then be adjusted as desired or needed in the margin with the other factors.

The analog building modeler 100 is defined herein as an apparatus that is configured to produce an 'analog building model' (also referred to herein as variables or factors regression model, an equivalent analog model, or an analog facility model) according to the end-use equations described herein.

The modeler 100 calculates the metered total building energy use as the sum of the primary building energy end-uses. A relatively small, set of parameters has proven to be comprehensive enough to support a reasonable energy balance and yet sufficiently independent to allow a defensible regression solution. The modeler uses a set of just eight key parameters—internal and external gain, aggregate normalized UA, heating and cooling efficiency, service water heating, heat intercept and cool intercept—to produce robust and repeatable energy signatures in gas-heated office buildings. These few parameters/variables can then be worked into estimates of the building energy end-uses.

The modeler operates with the monthly average temperature as the primary independent variable. At this monthly level of energy aggregation, the short term thermal transients are averaged out, leaving the seasonal temperature changes as the primary driver. At this high level of aggregation, an end-use building model, that can reasonably fit the observed monthly data, becomes algebraically quite simple. The variables used in this model are listed and discussed in Table 1 and in the accompanying discussion.

TABLE 1

Equivalent Analog Building Parameters

| Parameter, symbol | Units | Notes |
|---|---|---|
| Normalized Aggregate UA, $UA_n$ | BTU/deghr/ft² | Solved |
| Internal Gain, $Q_{in}$ | W/ft² | Solved |
| External Energy, $Q_{ext}$ | W/ft² | Fixed percentage of the internal gain |
| Normalized SWH, SWH | Gal/day/ft2 | Solved |
| Heat Intercept, $H_t$ | T deg F. | Solved |
| Cool intercept, $C_t$ | T deg F. | Solved |
| Heating Efficiency, $E_h$ | No units | Assumed to be .75 |
| Cooling Efficiency, COP | No units | Solved |

*Normalized to the floor area of conditioned space in the subject building.

The parameters in Table 1 have been found to be sufficient to support a general end-use energy model of a commercial building. Note in Table 1 that two of the parameters are assumed while the other six parameters are all solved from the data. Most of the energy use estimated by this model, (the baseload, the heating and cooling energy), is based on unique building parameters that are derived by regression from the data.

The parameters of Table 1 all play a role in the building energy model indirectly through their role in the calculation of the energy end-uses. Therefore this discussion of these parameters may refer to their role in the various energy end-use equations that follow.

Aggregate UA, $UA_n$—This is the aggregate heat loss parameter of the building. It includes the building thermal losses/gains and the ventilation losses/gains that are also temperature sensitive, all normalized per square foot of floor area. This variable algebraically represents the aggregate temperature dependent characteristic of the building including the thermal losses and ventilation losses, but not including the heating or cooling efficiency. Such an aggregate value would be very difficult to calculate directly by combinations of individual measurements. But in the context of the inverse model, the aggregate effect of all these thermal and ventilation factors is relatively straightforward to determine, and is useful in characterizing results. In general this temperature slope is slightly different from the visible slope in the building energy signature. In the end-use equations, it plays a role in estimating both the heating and cooling end-uses.

Internal Gain, $Q_{in}$, is the portion of the baseload that plays a role in the net load used to calculate the heating and cooling end-uses. In this model part of the baseload is an external gain that plays no role in the heating and cooling loads.

External Energy, $Q_{ext}$, is assumed to be a small fixed percentage of the Internal Gain; typically approximately 5%, but can vary from building to building. The main component of External Energy is typically, but not exclusively, outdoor lighting and signage. Notable exceptions include large data centers essentially located external to a building, large parking structures, etc.

Service Water Heating, SWH, is the average of the non-space-heat gas energy use that occurs in July-September expressed in units of heated gallons of water/day, which allows the scrutiny of this variable relative to a plausible hot water use for a building of that type. If there is no summer gas use and therefore no gas SWH, then electric SWH is assumed to be 0.002 gallons/day/ft$^2$. Estimates of the SWH end-use are based on a seasonally varying inlet water temperature and thus have a slight seasonal variation. There are many cases where this parameter is much larger than is plausible for hot water heating alone because it contains other significant summer gas usage such as for distribution loops or reheat.

Heat Intercept, $H_t$, is the highest temperature at which heating is observed, and it is assumed in the end-use equations that the heat load will linearly increase at temperatures below this. While this temperature is influenced by the interior set temperature, it also is affected by the internal gain and the control errors. In practice this temperature will be lower than the interior temperature when the internal gain is contributing to the heating, but many cases have been observed where this temperature is higher than the interior temperature. These suggest excess heating or re-heat. This heating intercept temperature is a strong indicator of potential control errors.

Cooling Intercept, $C_t$, is the lowest temperature at which cooling is observed, and it is assumed in the end-use equations that the cooling load will linearly increase at temperatures above this. While this temperature is influenced by the interior set temperature, it also is affected by the internal gain and the control errors. In practice this temperature will be lower than the interior temperature when the internal gain is contributing to the cooling load. This variable essentially partitions the electric energy between internal gain and cooling, and in mild cooling dominated climates (such as Southern California), there is no visible balance point temperature on the energy signature as to at what temperature the cooling begins. The cooling begins at the lowest observed temperature and increases linearly above that temperature. In these ambiguous cases, the cooling intercept is not well defined, and the model may incorrectly solve for an unreasonably low cooling intercept, which leads to an exaggerated cooling load and an unreasonably low internal gain. Therefore, this variable is constrained to be no lower than one degree Fahrenheit (approximately 0.6° C.) less than the minimum input temperature. This constraint essentially allows the reasonable maximum internal gain to be applied to the ambiguous cases.

Heating Efficiency, $E_h$, is the assumed heating efficiency. In principal it could be a solved instead of an assumed variable. However it is close to co-linear with the temperature sensitive Aggregate UA, and it lends some instability to the overall regression. While heating efficiency may vary from building to building, it will typically be in the range of 70-85%. In this work, the heating efficiency is assumed to be 75%. A few rare cases have been observed where the actual efficiency was considerably less than the assumed, and these cases were revealed in an unusually high aggregate UA and cooling efficiency COP.

Cooling Efficiency, COP, is the apparent coefficient of performance (COP) of cooling energy; i.e., the ratio of the thermal energy content of the cooled air relative to the electrical energy used to cool the air, as expressed in the same units of measurement. It assumes that the Aggregate UA for cooling is the same as the Aggregate UA used for heating. In practice this may not be the case as there may be more ventilation during a cooling season or some other thermal characteristic may change seasonally. The cooling COP includes the actual COP of the cooling, and it includes the effects of seasonal changes in the thermal characteristics.

The full analog building model comprises the sum of several energy end-use models which specify the energy for the specific end-uses as a function of average monthly temperature. Each equation or set of equations below for deriving and/or attributing a portion of the total monthly building energy usage to a specific end-use is defined herein as an 'end-use model equation'. A result derived from executing an end-use model equation or set of equations for a particular end-use is defined herein as an 'end-use model.' For example, an end-use model derived from the Internal Gain end-use model equation is defined herein as an 'Internal Gain model,' an end-use model derived from a 'Space Heat' gas end-use modeler is defined herein as a 'Space Heat model,' and so on for each equation or set of equations for each end-use described below.

The whole system of end-use equations consists of functions of the average monthly temperature and the model parameters in Table 1, and reduces in essence to a simultaneous equation in six unknowns. This system of equations is not readily solved by conventional linear regression, and is instead solved by means of an iterative steepest-descent convergence algorithm.

This type of mathematical approach rests on the assumption that there is a unique combination of real building model parameters that leads to a best fit to the data, and that the solution will not converge on a false set of parameters that also may lead to a good fit. Structuring the convergence path is always important in this type of mathematics, and it is usually done by carefully tailoring the initial conditions, and by controlling the iteration steps. The current building model has proved to be stable and repeatable for buildings with electric and gas energy.

The solution for the five analog building parameters is essentially a problem in five unknowns with about 12-24 items of information. Ideally this might be done algebraically, but it would be very tedious and it would be difficult to change as the process might be adapted to new situations.

A method that can avoid the algebraic complexity is referred to here as the method of steepest descent. This approach has been described in mathematical textbooks and is beyond the scope of this discussion to repeat in detail. A particular application is referred to as the Fletcher-Powell method. Generally this is an iterative method commonly used in complex problems. It starts by establishing a goodness of fit indicator, such as a CHI square or R square (here called the 'fit indicator'), that is proportional to the difference between the energy use data and estimates of the same data as derived from the analog building model.

Briefly the process starts with an assumed solution for all the unknown variables, and iteratively changes the values of all the unknowns at once by a small amount, always seeking changes that lead to a closer fit between the data and the model. The small changes of the unknowns are not at random, but for each of the iterations, each variable is changed in such a way as to lead to a slightly better fit.

The small incremental changes to each variable are derived by evaluating the model at two conditions: one with the current value of the variable and the second with the variable changed by a small fixed amount called the "fixed change in variable". These two evaluations of the model will produce two slightly different fit indicators. If the fit indicator increases, it indicates that the model fits the data better after the variable is changed. If the fit indicator decreases, it indicates that the fit is worse after the variable change. The underlying question for changing each variable is, "will this slightly changed variable make the fit better or worse?"

For each iteration, each variable is changed by an amount proportional to what is referred to here as the gradient for that variable, and specified by:

(Fit indicator 1−fit indicator 2)/(fixed change in variable), where the fixed change in variable is a different fixed number for each different variable.

For the analysis of building energy data, it has been found that the introduced change for each variable should typically be approximately 1/1000 of the initial value of the variable. In general, the gradient for each variable will change with the value of that variable and the other variables with each iteration. Thus a new gradient must be calculated for each unknown variable for each iteration.

The gradient for each variable is only proportional to the whole of the change to be applied to each variable. The full incremental change to be applied to each unknown variable will be based on the gradient multiplied by an activity factor. The activity factor in this analysis is generally a different constant number for each variable, and unlike the gradient, the activity factor does not change with each iteration.

Methods such as these require that the assumed starting point be reasonably close to the final solution, and that the iterative changes to the variables bear certain relationships to one another. In any particular problem, the success of the method depends on making good choices as to the starting point and the relative rates at which the variables are changed. If these choices are not good enough, then no satisfactory solution for the unknown variables will be found because the variables will all change in an uncoordinated way with each iteration, such that the difference between the data and the model will never be reduced, and in fact may increase substantially. This is referred to as a "failure to converge."

Getting the process to converge is the focal challenge in this type of mathematics. A good physical and mathematical understanding of a particular class of problems is required to make the method work for that class of problem. In this case the process is informed by the analysis of energy data from many hundreds of buildings, and this information has been used to devise a process that will reliably work with building energy data as discussed below.

The particular problem of interest here pertains to creating a model of a building's energy use. This is a particularly complex problem because the energy use data for a building can be strongly influenced by erratic occupancy behavior and non-constant malfunctioning controls, which may not be describable by any sort of model. In addition, even if the occupants and machinery are performing correctly and regularly, the model of the building energy use is at best a highly simplified approximation of a much more complex real situation. In short, there is a significant and unavoidable amount of error between any sort of building model and the data, and this difference can interfere with or alter the convergence of any data analysis or regression process, including this steepest descent method.

In spite of these significant sources of error, the energy use data for the majority of buildings shows very evident patterns. Therefore, for this particular class of problem, the selection of the initial conditions and the variable's incremental changes have been tailored to the physical nature of building energy use and the errors associated with it.

There is literally an infinite variety of combinations of initial variable conditions and activity factors, and many will lead to good results, though some combinations will need more iterations to converge successfully, and some combinations may not converge.

Among the combinations that can converge successfully, the value of a final solved variable will differ somewhat depending on the initial conditions, the activity factors, and even the size of the fixed variable change. The final values will be close regardless of the path leading to them, however, because this process is applied in the context of a "utility conservation meter," it is important to be specific as to the initial conditions and activity factors so that the calculation is rigorously repeatable.

Experience establishes that the values of the initial conditions and activity factors set forth in Table 2 will lead to a solution, of the unknown variables.

TABLE 2

Initial Values and Activity Factors

| Variable | Initial Value | Activity Factor |
|---|---|---|
| Normalized Aggregate UA | .1 BTU/deg F. hr/ft$^2$ | 1/500 |
| Internal Gain | .2 W/ft2 | 1/50 |
| Heat Intercept | 80 deg F. | 30 |
| Cool Intercept | 55 deg F. | 60 |
| Cooling Efficiency, COP | 2.2 | 1 |

Note the wide range in the activity factors. These have been chosen based on the application of this method to hundreds of buildings to lead to a satisfactory solution within 1000 iterations. The values of the unknown variables for the iteration with the highest fit indicator within the first thousand iterations are considered the solved values.

Typically a good solution will be evident after the first hundred or so iterations, and the fit indicator and the variables will remain almost constant for all later iterations. As an ordinarily skilled artisan will recognize, the large number of iterations and calculations especially lends itself to employment of the computer-based methods and system described according to one or more of the invented embodiments.

There are three common ways that this method can fail if not properly set up:
(1) the incremental changes in a variable may be too large, and the variable will overshoot, and then overcorrect itself in the next iteration (in some cases this leads to a trap for the regression as it oscillates between over and under shooting, for an indefinite number of iterations);
(2) the incremental changes for a variable may become very small so that it may take large numbers (e.g., thousands) of iterations to come to equilibrium; and
(3) an overshooting variable may cause other related variables to over or undershoot and the process may require large numbers of iterations for the errors to die out, or it may lead to an instability.

The conventional mathematical approach would have the activity factors all relate to one another as if they were the orthogonal components of a steepest descent vector, hopefully toward a final equilibrium. But this problem does not use a smooth mathematical function; there are break points in the function at the heating and cooling intercepts, and errors may make it even more irregular so that a conventional steepest descent approach can easily be derailed. The approach leading to the invented embodiments started as an attempt at a steepest descent, but then evolved into a layered approach in order to deal with the peculiarities of whole building energy data.

The invented approach utilizes the fact that, in an energy versus temperature space, the energy use in a building takes a common pattern for almost all buildings as in FIG. 2A. As presented in FIG. 2A, the differences between almost all commercial buildings are a matter of degree in the size and positioning of the several end use curves.

This regularity of end use relationships is a very significant benefit to the invented process, and allows the fitting process to be controlled so that progress to final equilibrium does not involve a significant amount of de-stabilizing overshooting and undershooting.

In the fitting process, the UA and Internal gain are dominant variables, i.e., most able to influence the overall ft. But there are important differences. The UA variable is closely linked geometrically to the heating and cooling intercepts and to the COP. So when UA overshoots, three other variables also change, resulting in a significant change of equilibrium. Our experience indicates that the most stable results are achieved when UA slowly approaches its equilibrium value from below. Accordingly, the iterative 'speed' of this variable is retarded by a very low activity factor of $1/500$, and a starting position that represents a very low value for this variable. In this way, the UA variable approaches the equilibrium almost exponentially with a minimum of overshoot. In essence, this variable sets the stage and the other variables dance upon it.

The internal gain variable exhibits some independence; not so directly linked to the other variables. In the regression process, its initial value is a typical value for the class of buildings, and it has an activity factor of $1/50$. This is a strong variable, but its overshoot is stable and muted.

The other variables, heat intercept, cool intercept, and COP, have relatively high activity factors in the range of 1 to 60. In a typical regression, these variables change in the later iterations after the dominant variables, UA and internal gain, have diminished most of the difference between the model and the data. Due to these variables relatively higher activity factors, they continue to change fast enough in the later iterations near the equilibrium, where all other variables change very slowly if at all. The initial value for COP is 2.2, a typical value.

The initial values of heat intercept and cool intercept are at the extremes of their ranges, with a starting heat intercept at 80 deg F., and a starting cool intercept at 50 or 55 deg F. As the iterations proceed, these variables change in a manner to follow the changes in UA in a simple coherent motion without much overshoot.

This fitting process transforms a general image to fit the particular data. The transformation proceeds gracefully, until arriving at a final signature of the actual whole building energy usage data including all fuels as fitted. The first few iterations show major movement, led by changes to UA and internal gain. The refinements involving the heating and cooling intercepts usually occur in the later iterations. As the regression proceeds, the coordinated movement of the variables is smooth and orderly, proceeding somewhat directly to the equilibrium. The internal gain and COP variables will overshoot and undershoot a bit, but this is a small ripple on the dominant theme of the process. The best fit is achieved after about 165 iterations in a typical but not exclusive embodiment.

The invented embodiments comprehend three important concepts:
1) the use of the temperature versus energy analytical space in which to express the end use functions, which shows the energy signatures and also provides a good way to review the overall energy use;
2) the use of a simple analog building model consisting of the particular eight variables that are used, which may appear to be an over-simplified aggregate large building model, but which is able to fit real world monthly energy data with all its common irregularities; and
3) the use of an analytical process that is stable when used with the particular modeling variables.

The end-use models depict simple linear descriptions of the end-uses, but the underlying situation is more complex because some end-use may bear an engineering relationship to other end-uses and to other fuels. For example, the gas heating depends upon the electric internal gain as does the electric cooling. The heating and cooling also depend on the building UA, which is usually revealed in the temperature slope of the gas heating. The building parameters are thus constrained to one another by the engineering relationships that prevail in the aggregate energy balance of a building.

Inside the analog building model, the building energy end-uses are expressed in units of kWh/day for the whole building. The end-use modeler equations (or simply 'end use equations') are defined herein as being the equations for each end use presented below. The end-use equations are all either constants or simple linear functions of the mean monthly temperature, t, and use the gross building area, $FT^2$.

Service Water Heating (SWH) electric and gas end-use factors are defined herein by and determined according to the following equations:

SWH electric, kWh/day=(SWH Setpoint temperature–Inlet Water temperature)*SWH (gal)*$FT^2$*8.33/3413/SWH elec eff, wherein 'SWH elec eff'=1. 'Inlet water temperature' is derived from an annual set of mean monthly outdoor temperatures.

SWH gas, kWh/day=(SWH Setpoint temperature–Inlet Water temperature)*SWH (gal)*$FT^2$*8.33/3413/SWH gas eff, wherein 'SWH gas eff'=0.65. The fuel type and amount of SWH is determined by review of summer gas use. If average normalized gas energy for July is greater than 0.001 W/ft$^2$, then gas SWH is assumed.

The Internal Electric Gain end-use factor is defined herein by and determined according to the following equation:

Internal gain, kWh/day=$Q_{in}*FT^2*24/1000$, wherein $FT^2$ is the area of building conditioned space.

The External Electric Gain end-use factor is defined herein by and determined according to the following equation:

External electric, kWh/day=Internal Gain*0.05

The Space Heat Gas end-use factor is defined herein by and determined according to the following equations:
First, gross space heat load, H gross, is calculated.

H gross=0 if $t>H_t$, the heat intercept. Otherwise, for $t<H_t$, H gross, kWh/day=$((H_t-t)*UA_n*24-Q_m*RG_h(t)*24*3.413)*FT^2/3413$, wherein $FT^2$ is the area of building conditioned space.

Space heat gas=$H$ gross/$E_h$, where $E_h$ is assumed=0.75.

Calculation of Retained Gain:

A key part of this calculation is an estimate of the fraction of internal gain that is part of the energy balance, $RG_h(t)$. Not all of the internal gain is retained in the energy balance because the gain often will not occur when there is a heat need and it is lost through venting or cooling. The portion of the internal gain that is retained in the energy balance is referred to as the "retained gain." In general the retained gain is dependent on the magnitude of the internal gain, the timing of the occupancy, the mass of the building, and the outdoor temperature. The amount of internal gain that finds its way into the energy balance is quite building specific and dependent on thermal transients and variable occupancy, i.e., it is potentially complicated.

Extensive hourly simulations have shown that the aggregate monthly retained gain can be represented by a function of temperature that is unique to each building. However the common features of the retained gain functions are that at low temperatures all of the gain is used, and at moderate temperatures almost none of the gain is used. This work assumes a standard linear retained gain function with a value of 1 at <=40 deg F., linearly diminishing to 0 at >=80 deg F.

The Heating Retained gain function(t), $RG_h(t)$ is defined herein by and is determined to:

= 1, if temperature <= 40 deg F.;

= 0, if temperature >= 80 deg F.; and

= (temperature-40)/(80-40), if 40 < temperature < 80 deg F.

In principle, cooling should be similar to heating, but the de-facto economizer/infiltration effects flush out and diminish the retained gain at lower temperatures. The retained gain function assumed for cooling, or 'Cooling Gain Function(t)', $RG_e(t)$ is defined herein by and determined to:

= 1, if temperature > 80 deg F.;

= 0, if temperature < $C_t$ the cooling intercept; and

= (temperature-$C_t$)/(80-$C_t$) for $C_t$ < temperature < 80

Space Heat Electric: In buildings predominantly heated by gas, space heat electric refers to the electric auxiliaries (fans, pumps, etc) associated with the distribution of the space heat.

The space heat electric end-use factor is defined herein by and determined according to the following formula:

Space heat electric, kWh/day=$H_{gross}/COP_{aux}$, wherein $COP_{aux}$ is the aggregate COP of the electric auxiliaries, assumed here to be 10.

Cooling Electric: The Cooling electric, kWh/day is defined herein by and determined to:

= 0, if $t < C_t$, the cooling intercept, and

= $((t - C_t)*24*UA_n + Q_{in}*RG_c(t)*24*3.413)*$ $FT^2/3413/COP$, for $t > C_t$.

Those of skill in the art will appreciate that many unique features of the invention emerge from an understanding of FIG. 3. First, real-time metering controller or "smart" controller 104 can make use of PID-based (formulae-based) inputs to make minute corrections in real time to heating and cooling subsystems, for example, such minute corrections generally being less costly than under-corrections followed by over-corrections. In other words, controller 104 can be computer-controlled or -assisted and can operate as a special-purpose machine that executes software instructions stored in memory to serve the important controller as well as meter function for a building that features the energy cost avoidance measures described herein.

Second, it will be appreciated that energy conservation calculator (or comparator or so-called "differencer") 106 can comprehend one or more of multiple factors from modeler 100 and one or more energy-consuming subsystems from scale-and-aggregate block 102 and a myriad of utility grade metered inputs from "smart" meter 104. Those of skill will appreciate that calculator 108 can also be computer-controlled or -assisted. Those of skill in the art also will appreciate that scale and aggregate block 102 captures as wide as reasonable and possible a data set for inclusion in a given ECM calculation to attract big utilities to join the energy-saving venture or to attract big capital or to attract legislation/regulation/incentives to attract lending or other co-development efforts or joint ventures. Such aggregation can be a simple aggregation of heating, cooling, and other energy-consumption subsystems within a building; or it can be an aggregation of the same across multiple facilities, e.g. buildings, within a block or campus.

Third, data sets/forms reporting mechanism 108 can output hardcopy or electronic reports useful to any party wishing to monitor the results of such energy conservation measurements. e.g. an ESCO or an ESPC may require a report rendered in a particularly useful form to the one or more users of the information. Mechanism 108 also can automate billing to lower reporting/billing costs and to increase reporting/billing efficiencies. Those of skill will appreciate that mechanism 108 can also be computer-controlled or -assisted.

Fourth, those of skill in the art will appreciate that original building design-to-conserve can commence at block 110, be modeled at block 100, and its energy cost-avoidance can be calculated at block 106. A report issued at block 108 can either prove or disprove—but more likely improve—the building design before it leaves the drawing board, and long before it goes on-line. Thus, building standards can be raised and designers or owners of building meeting those higher standards—or the providers of the design-improvement tools contemplated by the present invention—can be monetarily rewarded.

Fifth, provision of real-time (run-time) diagnostic/adjustment capabilities of the overall system that flows from realistic and thus more accurate models and possibly anomalous metering results will be appreciated. For example, if an economizer controller were to fail and leave the economizer running on a hot day, it would add considerably to the cooling requirement which, in turn, would lead to higher consumption than normal. By comparing the meter data with the projected as-improved baseline, the operator would immediately see the anomalous values and be able to diagnose and repair the problem.

Those of skill in the art will appreciate that the use of myriad variables or factors in modeling is costly. Those of skill will also appreciate that many of the variables are dependent upon one another, rather than being independent, e.g. hours of operation and occupancy each affects space usage. It will also be appreciated that the result of such multi-factor modeling is rather easily discounted. By 'discounted' it is meant that the results are questionable because many such diverse variables tend to cancel each other out over time.

Moreover, as the model's complexity grows, its credibility declines even if the model is comprehensive and reality-based. Thus, in accordance with one embodiment of the invention, the model is greatly simplified by considering relative few of the available variables. This is because too granular of a data source (producing a relatively greater volume of data) leads to an overwhelming analysis task, whereas too rough a data source (producing a relatively smaller volume of data) provides inadequate output. In other words, there is believed to be an optimum balance between data and information described thereby on which balance the present invention capitalizes.

In particular, it has been found that the most important variable is based on building science, e.g. the design, construction, materials, etc. of a facility, characterized by a building's signature reaction to outside temperature over time. Such an approach is more reality-based, and is simpler and thus more cost-effective. More importantly, such an approach is more credible and thus monetizable. Credibility also provides extensive value for benchmarking purposes, inasmuch as embodiments of the invention can be utilized to compare the energy use performance of different buildings/facilities in different environments and/or climates.

Referring to FIG. 4, invented system 10' is illustrated according to an embodiment that focuses on building science-based efficiency generators and closed-loop system verification and improvements. System 10' includes a building science modeler 200 (as described herein that takes into account a building's dynamic reaction to average outside temperature based upon its design, construction, layout, materials, etc.); an energy consumption model database (DB) 202 that stores the prediction results of such building science-based modeling; a real-time meter 204 that generates high-precision, real-time measurement data collected from the building's various heating, cooling, and other energy-consuming subsystems; a comparator 206 for comparing the modeled data with the metered data; and a utility/grid 208 into which energy saved is effectively fed. Utility/grid 208 in turn supplies energy to the building 210 that was modeled and is now being metered.

Embodiments of the building science modeler 200 are variously referred to herein as a 'factor(s) regression modeler,' an 'analog building and/or facility modeler,' a 'modeling mechanism,' or simply 'modeler,' and correspond with the modeler 100 of FIG. 3. These terms do not, however, necessarily indicate different structural configurations relative to one another, but instead indicate the several conceptual aspects of the modeler in one or more embodiments of the invention.

The modeler 200 is typically coupled with the metering portion 204, and configured with device-readable instructions stored at a non-transitory data storage medium either integral with or operatively coupled with modeler 200. In an exemplary but non-exclusive embodiment, the modeler includes a Microsoft Excel™ spreadsheet suitably configured with and/or with access to the equations, data, and other information described herein.

A non-transitory device-readable medium, as referred to throughout this description, can be a magnetic data storage medium (e.g., hard disc drive, etc.), an optical data storage medium (e.g., compact disc, etc.), a solid state memory medium (e.g., random access memory circuit device, etc.), or any combination thereof. Alternatively, a non-transitory device-readable medium can be any other suitable memory device not listed here but which would be known to an ordinarily skilled artisan, and at which data can be stored and from which data can be retrieved.

The modeler 200 instructions are configured, when executed by data processing circuitry (of a computing device, for example) to cause the modeling mechanism to process each of a first set of facility energy load data associated with a first time period, and a first set of external environmental temperature data associated with the first time period. According to an embodiment of the invented method and system, processing the data comprises producing an analog building model. More particularly, the processing comprises inserting the measured first period temperature into the equations indicated above, and iteratively solving the equations for the initially unknown value of each of the parameters in Table 1.

An analog building model typically represents the total energy load of a facility—during a first time period and at a first measured temperature—as a sum of the plural identified end-uses. A key breakthrough provided by the novel system of end-use model equations and by the novel processing thereof is that the resulting analog building model represents the particular building-science-governed energy load characteristics of the building. Therefore, the analog building model can subsequently serve as a quite precise tool for modeling theoretical energy loads of the facility under alternative temperature conditions.

Initially, the analog building model can be processed according to an average temperature of each of numerous portions of the first time period (e.g., monthly average temperatures of a year-long first time period), to produce a historical baseline energy load, against which later monthly facility energy load data can be compared to determine a quantified difference due to, for example, a non-routine energy conserving change in the facility.

Later processing a second set of environmental temperature data measured during a second, normally later time period, through the analog building model, comprises calculating an estimate, or projection, of what the energy load of that same facility would have been during that same first time period had the temperature instead been the same as during the second time period.

A second time period is typically monthly in duration in a preferred embodiment, but is not so limited, and can be either shorter or longer in duration. Time periods also need not be measured according to calendar intervals, but can include any designated, generally continuous time period. Time-based facility energy load data for a time period typically represent a total or substantially total facility energy load measurement for that time period.

The real-time meter 204 of invented system 10' is also referred to herein as a 'metering portion.' Metering portion 204 can be a single energy meter apparatus suitable for measuring an energy load of a facility, whether continuously or incrementally, or can include plural energy meter apparatuses each suitable to measure a separate portion of the total energy load of a facility. For example, metering portion 204 can include one or more electricity meters and/or one or more gas meters, or a combination of both.

Each provided meter can measure an overall energy load of a facility, or an overall facility load of a specific form of delivered energy (e.g., electricity, gas, etc.), or an energy load of a specific portion of a facility (e.g., one portion of a building, or one building of a plurality of buildings grouped as a 'facility,' etc.), or an energy load of one or more specific end-uses of a facility, or any combination thereof. Therefore, an ordinarily skilled artisan will recognize that metering portion 204 encompasses a broad range of configurations according to alternative embodiments.

An ordinarily skilled artisan will recognize that different forms of energy may be measured according to different units of measurement (e.g. B.T.U., watt/hours, etc.). Terms for measured units may also be expressed differently in different geographic regions, different industries, etc. Likewise, temperature can be measured according to different thermal measurement systems and/or units, e.g., Fahrenheit, Celsius, Kelvin, etc. Therefore, smart meter 204 in various embodiments can measure and/or report an energy load and/or temperature condition according to any one of or any combination of suitable such units, and/or can convert units of measurement to other units of measurement. For example, an embodiment of a meter 204 can measure an energy load in one unit of measurement and convert the measured value to another unit of measurement (e.g., process) for reporting to comparator (calculator) 206.

Meter 204 will, in an embodiment, include data processing circuitry suitably configured to perform such conversions. Meter 204 may likewise include a non-transitory data storage medium suitably configured to store measurement data, whether raw or processed/converted, prior to, during, and/or following such conversion processes, and to store coded instructions suitably configured when executed to cause the circuitry to convert the measurement data as indicated.

Metering portion 204 can also include one or more thermal meter apparatuses suitable to measure an environmental temperature external to a facility, A 'suitable' thermal meter apparatus can be nearly any device configured to precisely measure an ambient temperature (e.g., external environmental temperature) in real time, whether continuously or incrementally, and to render the thermal measurements as data available for use by the comparator (calculator) 206.

In at least one embodiment, the energy meter apparatus(es) and the thermal meter apparatus(es) are combined within a single (unitary) device. As such, a unitary real-time meter 204 can be installed at a facility and/or coupled with an energy delivery conduit. In at least one embodiment, the metering portion includes a controller portion operatively coupled with either or both of a heating subsystem and a cooling subsystem of a facility, and the controller portion includes instructions configured, when executed by circuitry as discussed above, to affect control of either or both of the heating and cooling subsystem, helping to avoid overheating, over cooling, or other excessive variations in building temperature control.

In a typical embodiment, the energy consumption model database (also referred to as an 'analog facility model database,' or simply 'database') 202 comprises a non-transitory data storage medium coupled with the modeler. Accordingly, the database is typically configured to receive from the modeler and to retrievably store an analog facility model.

The comparator ('calculator') 206 is coupled with the database 202, and is configured to retrieve an analog building model from the database and to compare the analog building model to facility energy load data collected during a later time period than was the facility energy load data used to construct the ABM. Generally, the later collected facility energy load data was collected during the same time period as was the external environmental temperature data used by the ABM.

The calculator typically comprises coded instructions stored at a non-transitory device-readable medium. In an embodiment, the instructions are configured, when executed by data processing circuitry, to cause the circuitry to calculate a sum of the plural identified end-use energy load portions of the analog facility, model. Additionally, the calculator will typically calculate a quantified difference between the later collected total energy load data and the sum of the plural identified end-use energy load portions of the first analog facility model. This quantified difference corresponds to an amount of energy returned to a utility grid by a non-routine change occurring in the facility between the two facility energy load data measurement time periods.

Such change could either increase or decrease the energy load of the facility. However, if the quantified difference indicates a reduced facility energy load, the change is generally recognized as resulting from a non-routine energy conserving change to the facility. If such change occurs under an energy supply contract that assigns credits for energy load reductions attributable to conservation measures, for example, the facility may be deemed to have earned a credit corresponding to the quantified difference and according to the terms of the contract.

As discussed above, an embodiment of the invented system also includes a data aggregator configured with instructions designed to cause the aggregator to aggregate energy load data from multiple buildings, for example, for collective treatment as a single facility. Although the data aggregator is not shown in FIG. 4, the aggregator should be understood to be an optional portion of the system. Therefore, it can be present in the system embodiment of FIG. 4 in much the same way as depicted at 102 in FIG. 3.

Generally, the data aggregator is operatively coupled with one or more of the modeler 200, the metering portion 204, and the energy consumption model data base 202, to receive data therefrom. The data aggregator is further coupled with the calculator/comparator 206 to provide one or more resulting aggregated data sets for comparison and calculation of a difference in energy load for the facility. Such aggregation not only increases the accuracy obtainable via the invented method, but also more directly represents the large scale interests of various ESCOs and potential investors in energy-conserving programs and technologies.

In an embodiment, the invented system includes at least one data recording mechanism (not shown in FIG. 4) operatively coupled with the calculator, and configured to record a quantified difference between an energy load in an analog facility model and a measured energy load in a set of time-based facility energy load data. Such recording can include either of storing machine-readable data for later retrieval, and/or producing a human-readable output. Therefore, data can be recorded at either or both of a non-transitory, machine-readable data storage medium and/or a human-readable medium, and a data recording mechanism will include and/or will be coupled with such media.

Embodiments of a data recording mechanism configured to produce a human-readable output include a printer, an electronic display device, or any other device configured to record a human-readable output, as would be recognized by an ordinarily skilled artisan.

In an embodiment, the invented system is coupled with a utility grid. For example, a utility grid may be coupled with the metering portion to receive redirected energy from the facility. Energy may be redirected to the grid by modifying the facility with an energy consumption-reducing material, device, reconfiguration, technology, or other non-routine change. Energy redirected from the facility to the grid pursuant to such change is quantified by the calculator, and can be reported to a relevant ESCO or other interested party.

'Redirected energy' is defined herein as a difference in facility energy load between an ABM adjusted baseline total energy load of the facility and a later measured energy load data for the facility following a non-routine change. Energy load differentials due to routine changes, however, are not generally considered herein to be redirected energy, nor are changes that result in an increased facility energy load. As described above, one of the key differences between the invented system and method is that effects on a facility energy load due to non-routine changes can typically be segregated from effects due to routine changes, with a relatively high degree of specificity.

Referring again to FIG. 4, an anomalous result may be detected in real-time at decision block 212, wherein an anomaly leads to a possible real-time diagnosis and/or repair at block 214. For example, a trace or plot of metered data might immediately indicate to a trained analyst that a heater has failed or was installed improperly. It is also possible that the anomalous result can lead to an improvement to the building's design, modeling, or energy-consuming subsystems at block 216 (such possibility being indicated by a dashed line).

To aid in diagnosing an anomalous result, the system is configured in an embodiment to produce a second analog building model using the facility energy load data and external environmental temperature data from the second time period.

Functional blocks 200, 202, 204 and 206 are referred to herein as an energy efficiency generator 218, as indicated by a dashed outline in FIG. 4. Those of skill in the art will appreciate that energy efficiency generator 218 may also include one or more of functional blocks 212, 214, and 216, since those functional blocks also add value to the energy efficiency proposition by way of closed-loop feedback and potentially real-time problem identification and resolution. Those of skill in the art will appreciate that any or all of the functional blocks shown in FIG. 4 can be implemented in hardware, firmware, or a combination thereof. For example, a general-purpose computer or processor can execute instructions stored in memory such that it acts as a special-purpose computer or a machine that transforms metered data into energy cost-avoidance reports and carbon credits that are tangible.

Figure 5:
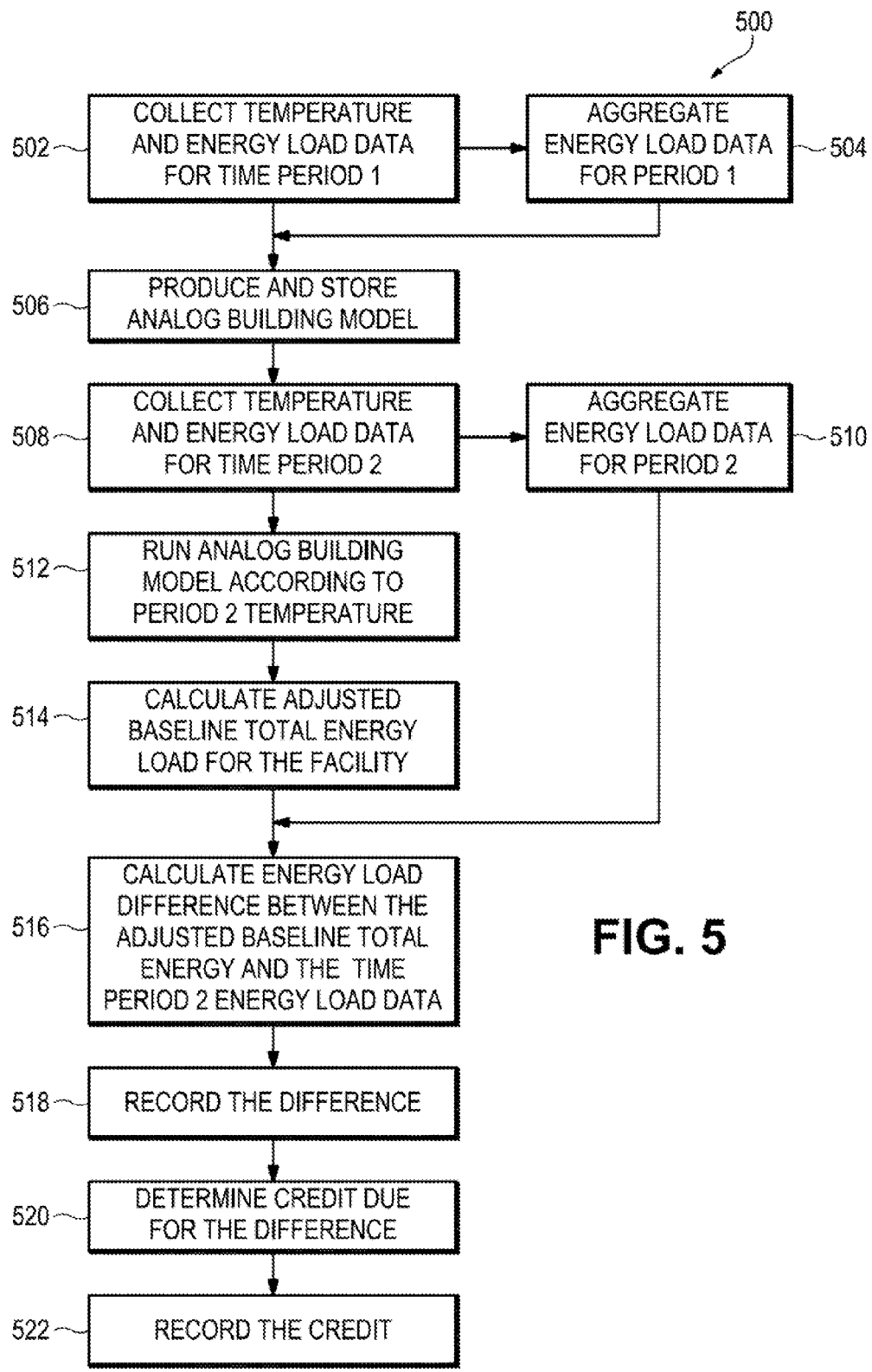
FIG. 5 is a flow diagram depicting an embodiment of a method for quantifying energy redirected from an energy-consuming facility to a metered utility grid.

FIG. 5 depicts an embodiment of a method 500 for quantifying efficiency-generated energy resources redirected from an energy-consuming facility to a metered utility grid utilizing the invented system. A first set of external environmental temperature data and a first set of total energy load data of the facility are collected throughout a first time period at 502. In an optional operation depicted at 504, wherein the facility comprises plural buildings, institutions, etc., a data aggregator aggregates the first time-based facility energy load data from the plural buildings to create a consolidated energy load data set for the facility.

At 506, the exemplary embodiment further includes processing the first collected sets of external environmental temperature data and total energy load data of the facility, the processing producing an analog facility model. In a typical embodiment, the processing includes executing an iterative steepest-descent convergence algorithm, using the end use model equations described above. The produced analog facility model includes plural model end-use energy load portions, a sum of which represents a total energy load for the analog facility model.

At 508, each of a second set of external environmental temperature data and a second set of total energy load data of the facility are collected by a metering device throughout a second time period. Typically, the second time period is chronologically later than the first time period. As with the operation at 504, a data aggregator, at 510, optionally aggregates the second time-based facility energy load data from plural buildings to create a second consolidated energy load data set for the facility.

At 512, the analog building model is run (e.g., processed) substituting the temperature data from the first period with the temperature data from the second time period. Then, at 514, an adjusted baseline total energy load of the facility is calculated by summing the adjusted end use energy loads resulting from the operation at 512. The adjusted baseline energy load represents an estimate of what the total energy load of the facility would have been during the first time period if the external environmental temperature during the first time period had been the same as the external environmental temperature during the second time period.

At 518, the exemplary embodiment further includes calculating (e.g., quantifying) a difference between the second set of total energy load data and the adjusted baseline total energy load of the facility. At 518, the difference is recorded at either or both of a non-transitory, machine-readable data storage medium and a human-readable medium.

At 520, the exemplary embodiment further includes determining a credit due against a contracted cost for energy corresponding to the quantified difference between the second set of total energy load data and the sum of the plural identified end-use energy load portions of the first analog facility model, and at 522, recording the credit at either or both of a non-transitory, machine-readable data storage medium and a human-readable medium. As used herein, a credit can represent and/or be nearly anything of value. For example, a credit can include any one or more of a reduced energy cost/price, an advance against future energy costs, access to one or more additional resources, access to an additional and/or premium service or service level, full or partial satisfaction and/or forgiveness of an obligation, etc.

One or more of operations 502 through 522 are performed in an embodiment of the invented method by data processing circuitry executing device-readable instructions stored at a non-transitory data storage medium. The circuitry can be a portion of a general purpose computer (e.g., a solid state microprocessor or another integrated circuit device), or can be a portion of a specialty device (e.g., an embodiment of a 'smart meter'). Generally, the circuitry will be operatively coupled with a non-transitory data storage means including instructions specially configured when executed by such circuitry to produce an analog facility model according to the described embodiments, and/or to perform any one or more of operations 502 through 522.

It has been found that energy savings over a range of approximately 15-60% are realizable and monetizable using the present invention. Thus, it is appreciated by those of skill in the art that the use of the unique regression model described and illustrated herein to predict future energy consumption baselines, a precision 'smart' meter to measure current, real-time energy consumption based upon improved building design and construction, and a comparator and reporting mechanism can semi-automate or fully automate the previously difficult task of accurate, repeatable, and thus reliable determination of the actual energy redirecting effects of non-routine facility change (e.g., carbon additionality). It is also appreciated that energy conservation (and energy conserved by conservation measures) can be sold as a valuable product whether back into the grid or as a new standard for design and construction or as a profitable energy conservation enterprise.

Those of skill in the art will appreciate that natural extensions of the science-based factoring and other regression modeling concepts embodied in the present invention present themselves. For example, a facility might include a single building, in which the parties in interest to the energy cost avoidance include the tenant, the landlord, and the building owner. Or a facility might include a city block having multiple buildings each readily modeled, but with an understanding of each building's impact on the other buildings in the block, e.g. sunlight exposure to direct or reflected light and heat. Or a facility might be a teaching hospital, a university, a business, or other institutional campus covering several city blocks or even acres, in which the interplay between even remotely located (e.g., widely separated) buildings might be comprehended by a regression model. For example, a building that incidentally produces a refrigerated-air stream by-product to its main purpose can be vented to a nearby building otherwise requiring an energy-consuming air conditioning subsystem. Thus, facility is intentionally broadly defined herein to include any and all such, single and multiple, local and remote, building combinations. Naturally, the advantages of aggregation and scale discussed above are easier to realize and to monetize for larger facilities.

It will be understood that the present invention is not limited to the method or detail of construction, fabrication, material, application or use described and illustrated herein. Indeed, any suitable variation, of fabrication, use, or application is contemplated as an alternative embodiment, and thus is within the spirit and scope, of the invention.

It is further intended that any other embodiments of the present invention that result from any changes in application or method of use or operation, configuration, method of manufacture, shape, size, or material, which are not specified within the detailed written description or illustrations contained herein yet would be understood by one skilled in the art, are within the scope of the present invention.

Finally, those of skill in the art will appreciate that the invented method, system and apparatus described and illustrated herein may be implemented in software, firmware or hardware, or any suitable combination thereof. Preferably, the method system and apparatus are implemented in a combination of the three, for purposes of low cost and flexibility. Thus, those of skill in the art will appreciate that embodiments of the methods and system of the invention may be implemented by a computer or microprocessor process in which instructions are executed, the instructions being stored for execution on a computer-readable medium and being executed by any suitable instruction processor.

Accordingly, while the present invention has been shown and described with reference to the foregoing embodiments of the invented apparatus, it will be apparent to those skilled in the art that other changes in form and detail may be made therein without departing from the spirit and scope of the invention as defined in the appended claims.

We claim:

1. An energy conservation metering system, comprising:
   one or more energy load meters operably coupled with a facility's energy supply system suitably to either individually or collectively measure a total energy load of the facility, wherein the one or more energy load meters further collectively include data output circuitry suitable to produce data indicative of the measured total facility energy load during a first time period;
   a data record stored at a tangible, machine-readable medium, including data indicative of an external environmental temperature during the first period measured at one or more thermal meters disposed and configured suitably to measure an external environmental temperature proximate the facility and to produce the data indicative of an external environmental temperature during the first period; and
   data processing circuitry operably coupled with one or more non-transitory data storage media, wherein the data storage media either individually or collectively include stored device-executable coded instructions configured, when executed by the data processing circuitry, to cause the data processing circuitry to:
      process both of the data indicative of the measured facility total energy load during the first time period and the data indicative of the measured external environmental temperature during the first time period;
      disaggregate plural identified end-use energy load portions from the measured facility total energy load; and
      produce a first analog facility model comprising the plural identified end-use energy load portions corresponding to the measured external environmental temperature during the first time period.

2. The energy conservation metering system of claim 1, wherein the stored device-executable coded instructions are further configured, when executed by the data processing circuitry, to cause the data processing circuitry to:
   process the first analog facility model according to data indicative of an external environmental temperature measured during a second time period; and
   produce an adjusted second analog facility model in which plural adjusted end-use energy load portions correspond to the external environmental temperature measured during the second time period.

3. The energy conservation metering system of claim 2, wherein the second time period and the first period are different in duration.

4. The energy conservation metering system of claim 2, wherein the stored device-executable coded instructions are further configured, when executed by the data processing circuitry, to cause the data processing circuitry to:
   compare a sum of the plural adjusted end-use energy load portions of the adjusted second analog facility model to a total energy load of the facility measured during the second time period; and
   calculate a quantitative difference therebetween.

5. The energy conservation metering system of claim 1, further comprising the one or more thermal meters.

6. The energy conservation metering system of claim 1, wherein the processing, end-use energy load portion disaggregating, and first analog facility model producing operations comprise executing an iterative steepest-descent convergence algorithm.

7. The energy conservation metering system of claim 2, further comprising:
a controller portion operatively coupled with either or both of a heating subsystem and a cooling subsystem of a facility, the controller portion including instructions configured, when executed by data processing circuitry, to affect control of either or both of the heating and cooling subsystem.

8. The energy conservation metering system of claim 1, wherein the facility comprises any of one or more buildings, one or more factories, one or more campuses, or any combination thereof.

9. The energy conservation metering system of claim 5, wherein at least one of the one or more thermal meters and at least one of the one or more energy load meters are combined within a single device.

10. The energy conservation metering system of claim 2, further comprising:
a data recording mechanism operatively coupled with the data processing circuitry and configured to record the calculated quantitative difference at either or both of a non-transitory, machine-readable data storage medium and a human-readable medium.

11. The energy conservation metering system of claim 8, wherein the device-executable coded instructions are further configured, when executed by the data processing circuitry, to cause the data processing circuitry to aggregate measured total facility energy load of plural buildings of a facility during the first time period prior to the processing with the data indicative of the measured external environmental temperature during the first time period.

12. The energy conservation metering system of claim 1, wherein the device-executable coded instructions are further configured, when executed by the data processing circuitry, to cause the data processing circuitry to derive an hourly load factor from one or more of the end use energy load portions.

13. The energy conservation metering system of claim 12, wherein the device-executable coded instructions are further configured, when executed by the data processing circuitry, to cause the data processing circuitry to derived hourly load factors for each hour of a twenty-four hour period.

14. The energy conservation metering system of claim 2, wherein the second time period is a twenty-four hour period.

15. The energy conservation metering system of claim 1, wherein end use load factors of the first analog facility model comprise a service water heating end use factor, an internal electric gain end-use factor, an external electric gain end-use factor, and a space heat end-use factor.

16. The energy conservation metering system of claim 6, wherein the iterative steepest-descent convergence algorithm includes equivalent analog building parameters of normalized aggregate heat loss, internal gain, external energy, normalized service water heating, heat intercept, cooling intercept, heating efficiency and cooling efficiency.

17. An energy conservation metering method, comprising:
obtaining data indicative of a total energy load of a facility for a first time period;
obtaining data indicative of an external environmental temperature corresponding to the facility for the first time period;
processing, by data processing circuitry executing coded instructions accessed at a non-transitory data storage medium, both of the data indicative of the facility total energy load and the data indicative of the external environmental temperature;
disaggregating, by the data processing circuitry executing the coded instructions, plural identified end-use energy load portions from the data indicative of the total facility energy load; and
producing, by the data processing circuitry executing the coded instructions, a first analog facility model comprising the plural identified end-use energy load portions.

18. The energy conservation metering method of claim 17, wherein the obtaining data indicative of a total energy load of a facility comprises determining an anticipated facility total energy load based on a design of the facility.

19. The energy conservation metering method of claim 17, wherein the obtaining data indicative of a total energy load of a facility comprises determining an anticipated post-alteration facility total energy load based on a contemplated alteration to an energy-load affecting feature of an existing facility.

20. The energy conservation metering method of claim 17, further comprising:
processing, by the data processing circuitry executing the coded instructions, the first analog facility model according to data indicative of an external environmental temperature corresponding to the facility and measured during a second time period; and
producing, by the data processing circuitry executing the coded instructions, an adjusted second analog facility model in which plural adjusted end-use energy load portions correspond to the external environmental temperature measured during the second time period.

21. The energy conservation metering method of claim 20, further comprising:
obtaining data indicative of a total energy load of the facility for the second time period;
comparing, by the data processing circuitry executing the coded instructions, a sum of the plural adjusted end-use energy load portions of the adjusted second analog facility model to the data indicative of a total energy load of the facility for the second time period; and
calculating, by the data processing circuitry executing the coded instructions, a quantitative difference between the sum of the plural adjusted end-use energy load portions of the adjusted second analog facility model and the data indicative of a total energy load of the facility for the second time period.

22. The energy conservation metering method of claim 17, wherein the processing, disaggregating and producing operations collectively comprise executing an iterative steepest-descent convergence algorithm.

* * * * *